US007328934B2

(12) United States Patent
Sato

(10) Patent No.: US 7,328,934 B2
(45) Date of Patent: Feb. 12, 2008

(54) SLIDING DOOR OPENING AND CLOSING DEVICE

(75) Inventor: Masaei Sato, Kiryu (JP)

(73) Assignee: Mitsuba Corporation, Gunma (JP)

( * ) Notice: Subject to any disclaimer, the term of this patent is extended or adjusted under 35 U.S.C. 154(b) by 42 days.

(21) Appl. No.: 11/455,059

(22) Filed: Jun. 16, 2006

(65) Prior Publication Data

US 2006/0284447 A1 Dec. 21, 2006

(30) Foreign Application Priority Data

Jun. 17, 2005 (JP) ............................ 2005-178532

(51) Int. Cl.
*B60J 5/06* (2006.01)

(52) U.S. Cl. ........................................ 296/155; 49/360

(58) Field of Classification Search ................ 296/155; 49/360, 280, 404, 214, 139, 362; 280/804; 318/286

See application file for complete search history.

(56) References Cited

U.S. PATENT DOCUMENTS 4,640,050 A * 2/1987 Yamagishi et al. ........... 49/280
4,887,390 A * 12/1989 Boyko et al. ................. 49/280
5,069,000 A * 12/1991 Zuckerman .................. 49/360
5,323,570 A * 6/1994 Kuhlman et al. ............. 49/360
5,737,876 A * 4/1998 Dowling ...................... 49/360
5,913,563 A * 6/1999 Watanabe et al. ........... 296/155
6,164,015 A * 12/2000 Kawanobe et al. ........... 49/360
6,198,242 B1 * 3/2001 Yokomori et al. .......... 318/286
6,321,489 B1 * 11/2001 Murofushi et al. ........... 49/360
6,530,619 B2 * 3/2003 Fukumoto et al. .......... 296/155
6,935,071 B2 * 8/2005 Yokomori et al. ............ 49/360
2004/0070231 A1 * 4/2004 Yogo et al. ................. 296/155
2004/0182008 A1 * 9/2004 Yokomori et al. ............ 49/360
2005/0055883 A1 * 3/2005 Sato et al. ..................... 49/360
2006/0042168 A1 * 3/2006 Yamada et al. ............... 49/360
2006/0143986 A1 * 7/2006 Yokomori et al. ............ 49/360

FOREIGN PATENT DOCUMENTS

JP 03-248914 11/1991
JP 2003-082928 3/2003
JP 2005-247100 9/2005
JP 2005-248514 9/2005

* cited by examiner

*Primary Examiner*—Kiran B. Patel
(74) *Attorney, Agent, or Firm*—McCormick, Paulding & Huber LLP

(57) ABSTRACT

There is provided a sliding door opening and closing device that improves layout flexibility of a driving unit in a self-propelled sliding door opening and closing device in which the driving unit is disposed on a sliding door side and that can protect a cable member without adding a component such as a decorative sheet. A lower rail is fixed to the vehicle body, and a lower arm guided along the lower rail is fixed to the sliding door. A driving unit for driving the sliding door for opening and closing has a drum driven by an electric motor for rotation. A cable is wound around the drum, wherein one end of the cable is fixed to the vehicle body on a vehicle-front side of the lower rail and the other end thereof is fixed to the vehicle body on a vehicle-rear side of the lower rail. This driving unit is incorporated inside the lower arm so as to be integrally formed with the lower arm.

4 Claims, 6 Drawing Sheets

SLIDING DOOR OPENING AND CLOSING DEVICE

CROSS-REFERENCE TO RELATED APPLICATIONS

Applicant hereby claims foreign priority benefits under U.S.C. § 119 from Japanese Patent Application No. 2005-178532 filed on Jun. 17, 2005, the contents of which are incorporated by reference herein.

BACKGROUND OF THE INVENTION

The present invention relates to a sliding door opening and closing device for automatically opening and closing a sliding door provided at a platform of a side of a vehicle body.

In wagon-type or minivan-type vehicles, a sliding door is often used as a door that opens and closes the platform provided at the side of the vehicle body. For such a sliding door, an upper arm and a lower arm provided with roller assemblies are fixed to an upper end and a lower end on a vehicle-front side, respectively. At an end on a vehicle-rear side, a center arm provided with a roller assembly is fixed. On the vehicle body, an upper rail and a lower rail are fixed so as to be positioned at an upper edge and a lower edge of the platform, respectively. On the vehicle-rear side of the platform, a center rail is fixed so as to be positioned at an intermediate portion in a vehicle-vertical direction. The roller assembly of each arm is guided along the corresponding rail. Therefore, the sliding door can be opened and closed in a vehicle-longitudinal direction along the side of the vehicle body.

On the other hand, to facilitate opening and closing operations of the sliding door, there has been developed a sliding door opening and closing device for automatically opening and closing the sliding door by a driving unit in which an electric motor or the like is used as a driving source. As the opening and closing device, there is a so-called self-propelled device having a structure, for example as disclosed in Japanese Patent Laid-Open Publication No. 2003-82928, in which a driving unit is disposed in the sliding door and a cable as a cable member fixed to the vehicle body is pulled by the driving unit to open and close the sliding door. In a self-propelled opening and closing device, the cable is fixed to the vehicle body at both ends of the center rail. The driving unit has a drum driven for rotation by the electric motor. The cable is guided into the sliding door through the center arm, and an intermediate portion of the cable is wound around the drum a plurality of times. Therefore, when the electric motor is operated to rotate the drum, one end of the cable in the vehicle-longitudinal direction is wound up by the drum and the other end thereof is wound back from the drum, thereby causing the sliding door to automatically be opened and closed. Also, both ends of the cable are fixed to the vehicle body through tensioners serving as tension generators, so that even if the sliding door reaches to a curved portion of the center rail near a full-close position, slackness of the cable is taken by the tensioners, thereby keeping cable tension constant.

SUMMARY OF THE INVENTION

However, if the driving unit is incorporated inside the sliding door as in the conventional opening and closing device, dimensions and mounting positions of the respective devices are restricted in order to prevent the driving unit from interfering with a power window device, a locking mechanism, or the like located inside the sliding door and from getting wet with rain or the like, whereby layout flexibility decreases and design costs increase.

Also, in the conventional opening and closing device, the cable is disposed over the center rail. Therefore, when the sliding door is closed to a full-close position, the cable is exposed outside together with the center rail. Moreover, to improve the appearance of the vehicle, some vehicles have decorative sheets or the like mounted along the center rail. Even in such a configuration, however, the cable has still become viewed from the outside.

An object of the present invention is to improve layout flexibility of a driving unit in a self-propelled sliding door opening and closing device in which the driving unit is disposed on a sliding door side.

Another object of the present invention is to provide a sliding door opening and closing device capable of protecting a cable member even at a time of fully opening the sliding door.

A sliding door opening and closing device according to the present invention is a device for automatically opening and closing a platform provided in a side of a vehicle body by a sliding door, and comprises: a guide rail fixed to the vehicle body; an arm member fixed to the sliding door and guided along the guide rail; a cable member, one end of the cable member being fixed to the vehicle body on one end side of the guide rail and the other end thereof being fixed to the vehicle body on the other end side of the guide rail; and a driving unit having a rotating member over which the cable member is bridged and a driving source for driving the rotating member for rotation, the driving unit driving the sliding door for opening and closing, wherein the driving unit is provided to the arm member.

The sliding door opening and closing device according to the present invention is such that both ends of the cable member are fixed to the vehicle body through tension generators.

The sliding door opening and closing device according to the present invention is such that the guide rail is fixed to a lower edge of the platform, and the arm member is fixed to a lower end of the sliding door.

The sliding door opening and closing device according to the present invention is such that the driving unit is incorporated inside the arm member.

According to the present invention, the driving unit is provided to the arm member, which is fixed to the sliding door and guided along the guide rail. Therefore, even if the sliding. door opening and closing device is of a self-propelled type in which the driving unit is disposed on a side of the sliding door, the driving unit can be laid out without consideration of interference with other devices disposed inside the sliding door. Accordingly, it is possible to improve layout flexibility of the driving unit and that of the respective devices disposed inside the sliding door. After the sliding door is mounted on the vehicle body, the driving unit can be mounted on the arm member and the cable member can be fixed to the vehicle body. Thus, mountability of this sliding door opening and closing device on the vehicle body is improved. Also, after the sliding door is mounted on the vehicle, the driving unit and the like can be mounted, thereby making it possible to facilitate a distinction in specifications between vehicles on which the sliding door opening and closing device is mounted and vehicles without it.

Furthermore, according to the present invention, the ends of the cable member are fixed to the vehicle body through the tension generators. Therefore, even after the sliding door opening and closing device is mounted on the vehicle, predetermined tension can be applied to the cable member and also the tension can be adjusted.

Still further, according to the present invention, the guide rail is fixed to the lower edge of the platform and the arm member is fixed to the lower end of the sliding door. Therefore, when the sliding door is closed to a full-close position, the cable member as well as the guide rail can be covered with the sliding door. Accordingly, when the sliding door is closed, the cable member is not exposed outside. Thus, the cable member can be protected without providing separately a member such as a decorative sheet, and concurrently the appearance of the vehicle can be improved.

Still further, according to the present invention, since the driving unit is incorporated inside the arm member, the arm member on which the driving unit is mounted can be downsized and made thinner. For this reason, even if the guide rail is fixed to the lower edge of the platform, height of a floor of the vehicle body can be decreased.

DESCRIPTION OF THE PREFERRED EMBODIMENTS

Embodiments of the present invention will be described in detail below based on the drawings.

Figure 1:
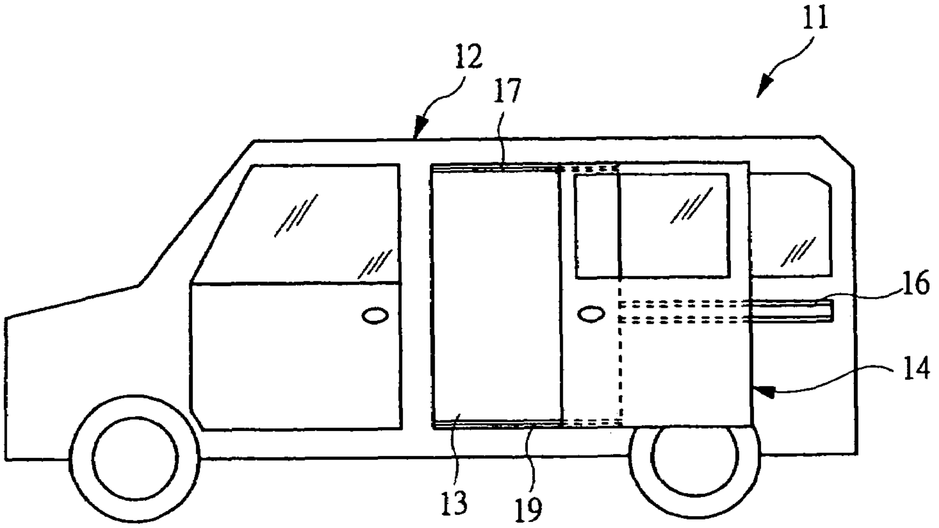
FIG. 1 is a schematic side view of a vehicle equipped with a sliding door opening and closing device according to an embodiment of the present invention.

FIG. 1 is a schematic side view of a vehicle equipped with a sliding door opening and closing device according to an embodiment of the present invention. This vehicle 11 is provided with a sliding door 14 for opening and closing a platform 13 provided at a side of a vehicle body 12.

Figure 2:
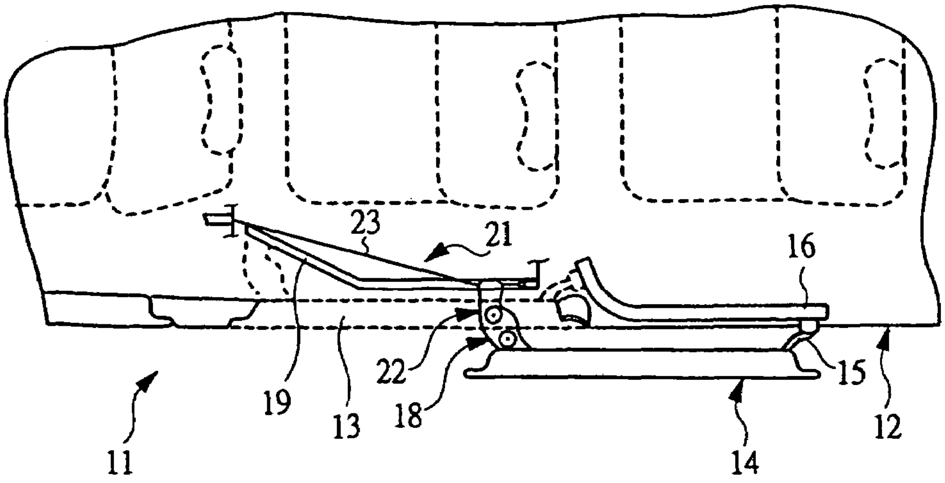
FIG. 2 is a view for explaining a configuration of attaching a sliding door shown in FIG. 1 to the vehicle.

FIG. 2 is a view for explaining a configuration of attaching the sliding door shown in FIG. 1 to the vehicle. A center arm 15 is fixed to an end on a vehicle-rear side of the sliding door 14, and a center rail 16 is fixed on a vehicle-rear side of the platform 13 so as to be positioned at a substantially intermediated portion in a vehicle-vertical direction. Therefore, the center arm 15 is guided along the center rail 16 so as to be movable in a vertical-longitudinal direction. Also, an unshown upper arm is fixed to the vehicle-front side of the sliding door 14 so as to be positioned at an upper end of the sliding door, and an upper rail 17 is fixed to the vehicle body 12 so as to be positioned at an upper edge of the platform 13. Therefore, the upper arm is guided along the upper rail 17 so as to be movable in the vehicle-longitudinal direction. Furthermore, a lower arm 18 as an arm member is fixed to the vehicle-front side of the sliding door 14 so as to be positioned at a lower end of the sliding door, and a lower rail 19 as a guide rail is fixed to the vehicle body 12 so as to be positioned at a lower edge of the platform 13. Therefore, the lower arm 18 is guided along the lower rail 19 so as to be movable in the vehicle-longitudinal direction. As such, the sliding door 14 is guided at its rear end along the center rail 16 and at its front end along the upper rail 17 and the lower rail 19 so as to be openable and closable in the vehicle-longitudinal direction and between a full-open position indicated by a solid line in FIG. 2 and a full-close position indicated by a dotted line therein. A retract portion curved toward an inside of the vehicle body 12 is provided on the vehicle-front side of each of the rails 16, 17, and 19. Accordingly, when the sliding door 14 is closed to the full-close position, each of the arms 15 and 18 are guided to the retract portion, thereby causing the sliding door 14 to retract into the inside of the vehicle body 12 for closing.

Figure 3:
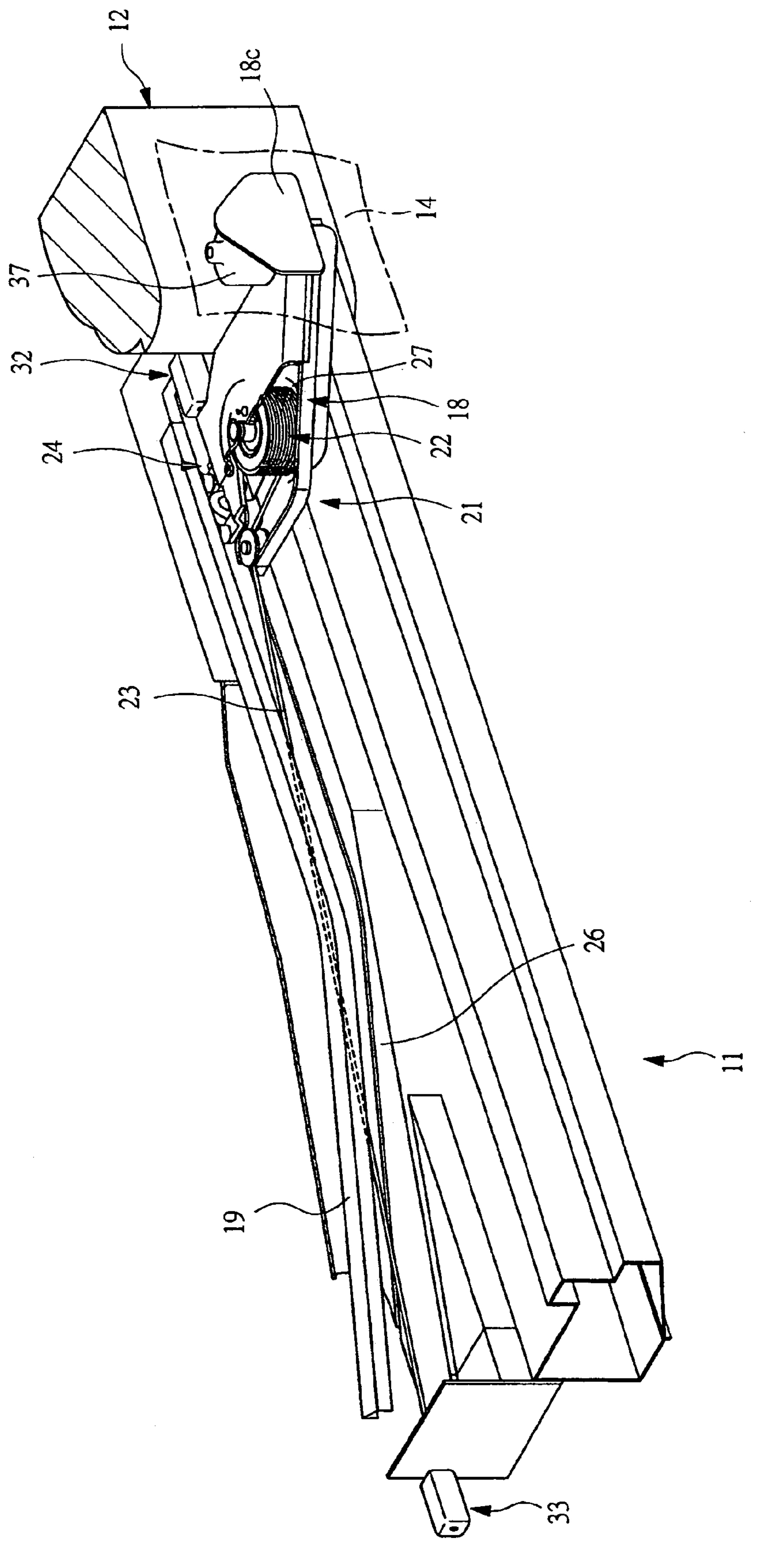
FIG. 3 is a perspective view of the sliding door opening and closing device.

FIG. 3 is a perspective view showing the sliding door opening and closing device. To automatically open and close the sliding door 14, the vehicle 11 is provided with a sliding door opening and closing device 21 (hereinafter referred to as an "opening and closing device 21"). The opening and closing device 21 has a driving unit 22 provided on a side of the sliding door 14 and a cable 23 as a cable member of which both ends are fixed to the vehicle body 12. Therefore, the opening and closing device 21 becomes a so-called self-propelled type in which the sliding door 14 is caused to be opened and closed by pulling the cable 23 by the driving unit 22. Further, in this opening and closing device 21, since the driving unit 22 is provided to the lower arm 18, the driving unit 22 is prevented from interfering with a power window device, a locking mechanism, or the like disposed inside the sliding door 14, whereby the layout flexibility of this opening and closing device 21 is improved.

Figure 4:
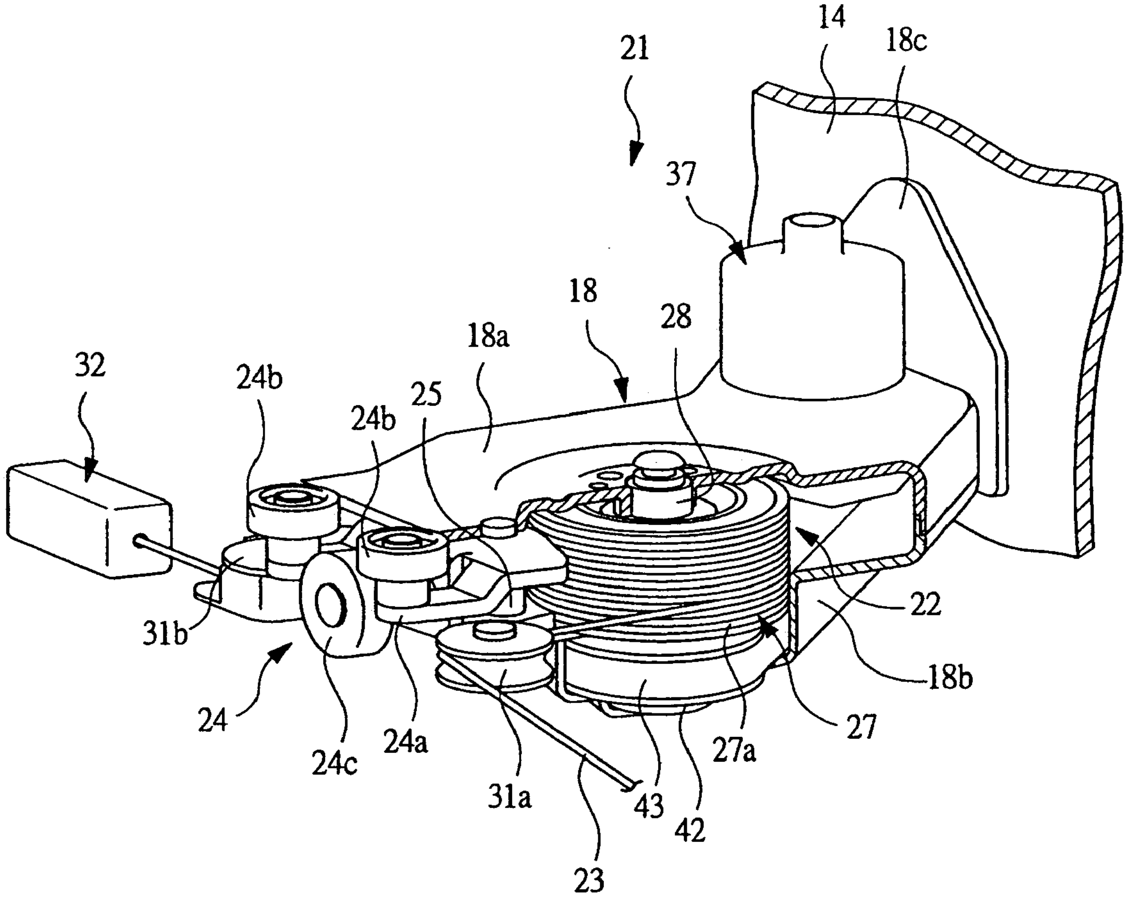
FIG. 4 is a perspective view showing details of a lower arm shown in FIG. 3.
Figure 5:
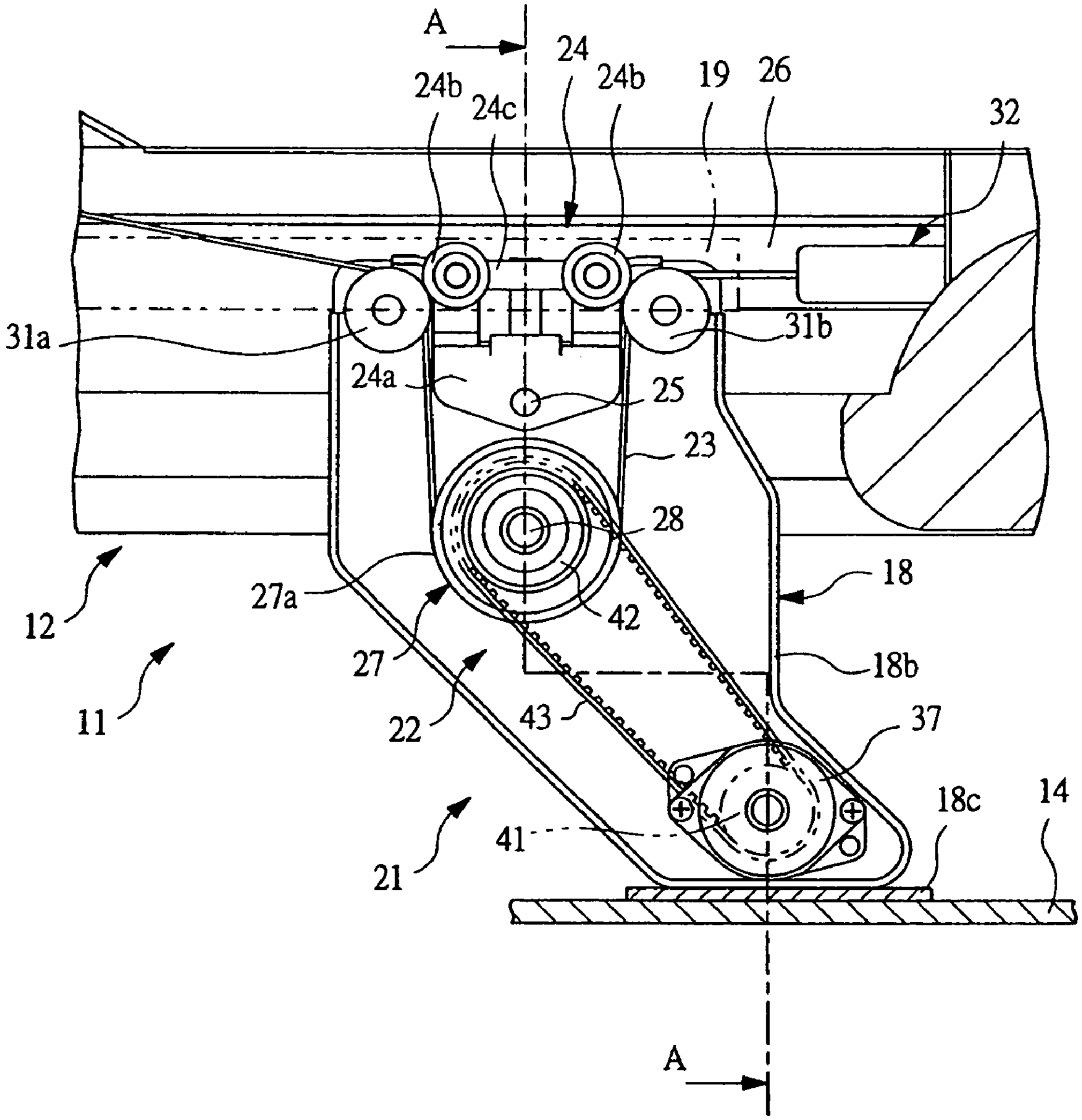
FIG. 5 is a front view showing layout of a driving unit shown in FIG. 4.

FIG. 4 is a perspective view showing details of the lower arm shown in FIG. 3; FIG. 5 is a front view showing layout of the driving unit shown in FIG. 4; and FIG. 6 is a section view taken along line A-A line shown in FIG. 5.

Figure 6:
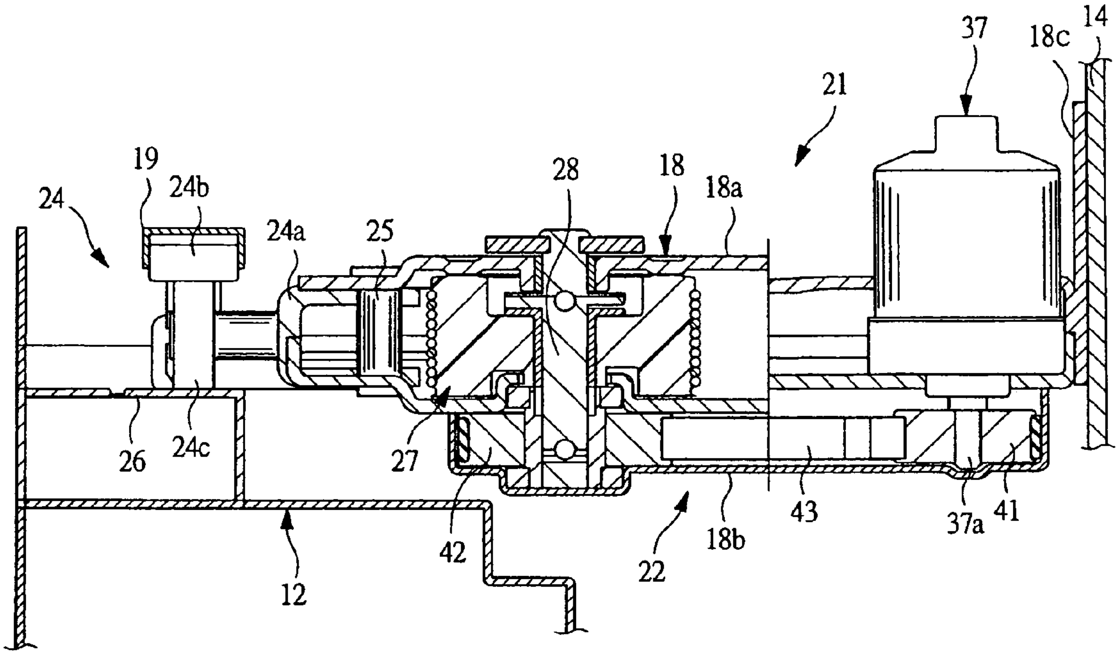
FIG. 6 is a section view taken along line A-A shown in FIG. 5.

As shown in FIGS. 4 and 6, the lower arm 18 is configured by combining an upper-side case 18*a* and a lower-side case 18*b* that are each formed in a bath-tub shape using a steel sheet or the like. Further, the lower arm 18 is fixed to the sliding door 14 through welding, a fastening member, or the like at a flange portion 18*c* provided at a base (on sliding door side) of the lower arm 18. Also, a tip portion of the lower arm 18 (on a side opposite to the sliding door) is provided with a roller assembly 24 for guiding the lower arm 18 along the lower rail 19. This roller assembly 24 has: a base bracket 24*a*; a pair of guiding rollers 24*b* rotatably mounted on the base bracket 24*a*; and a running roller 24*c*. The base bracket 24*a* is supported by a pin member 25 located between the upper-side case 18*a* and the lower-side case 18*b*, thereby becoming swingable to the lower arm 18. The guiding rollers 24*b* are supported upward toward the base bracket 24*a*, while the lower rail 19 is formed in a C-shaped cross section whose opening is downward. Therefore, the guiding rollers 24*b* are incorporated in the lower rail 19 so as to rotate along the lower rail 19. The running roller 24*c* is supported laterally to the base bracket 24*a*, while the vehicle body 12 is provided with a running panel 26 that faces the lower rail 19. Accordingly, the running roller 24*c* travels on the running panel 26. In this way, since the roller assembly 24 travels on the running panel 26 while being guided along the lower rail 19, the lower arm 18 moves along the lower rail 19. Also, since the base bracket 24*a* becomes swingable in a horizontal plane with respect to the lower arm 18, the lower arm 18 can follow the lower rail 19 even when the roller assembly 24 reaches to the retract portion of the lower rail 19.

A portion between the upper-side case 18*a* and the lower-side case 18*b* of the lower arm 18, that is, an interior of the lower arm 18 is formed in a hollow shape. The driving unit 22 is incorporated inside the lower arm 18 so as to be configured integrally with the lower arm 18.

As shown in FIGS. 4 to 6, the driving unit 22 has a drum 27 as a rotating member. This drum 27 is disposed so as to be able to be driven by a rotating shaft 28 rotatably supported by the lower arm 18, and is rotatably accommodated inside the lower arm 18. A spiral guide groove 27*a* is formed in an outer surface of the drum 27, and the cable 23 as a cable member along the guide groove 27*a* is bridged across, namely, wound around the drum 27 a plurality of times. An end of the cable 23 is guided to the vehicle-front side through a guide pulley 31*a* rotatably supported by the lower-side case 18*b*, and is fixed to the vehicle body 12 on one end side of the lower rail 19, that is, at an end on the vehicle-front side. Also, the other end of the cable 23 is guided to the vehicle-rear side through a guide pulley 31*b* rotatably supported by the lower-side case 18*b*, and is fixed to the other end side of the vehicle body 12, that is, at an end on the vehicle-rear side.

As shown in FIG. 3, both ends of the cable 23 are provided with tensioners 32 and 33 serving as tension generators, and are fixed to the vehicle body 12 through these tensioners 32 and 33. Note that since the tensioners 32 and 33 provided at both ends of the cable 23 basically have the same configuration, only the tensioner 32 disposed on the vehicle-rear side of the lower rail 19 will be described below.

Figure 7:
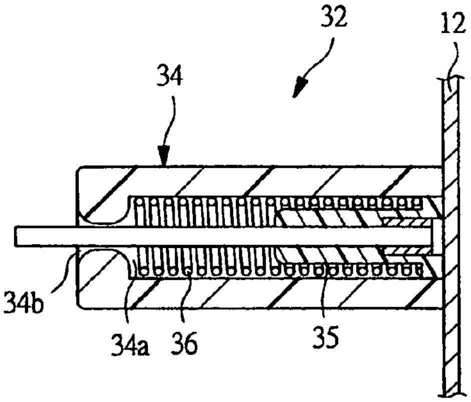
FIG. 7 is a section view showing details of a tensioner.

FIG. 7 is a section view showing details of the tensioner. The tensioner 32 has a sleeve 34 fixed to the vehicle body 12 by an unshown fastening member or the like. An accommodation chamber 34*a* is formed in the sleeve 34, and a slide block 35 is accommodated in the accommodation chamber 34*a* so as to be movable in an axial direction. A tip portion of the sleeve 34 is provided with an inserting hole 34*b*, one end of the cable 23 is inserted into the accommodation chamber 34*a* from the inserting hole 34*b*, and a tip of the inserted cable 23 is fixed to the slid block 35. Also, a spring member 36 biasing the slide block 35 in a direction of taking the cable 23 in the sleeve 34 is accommodated in the accommodation chamber 34*a*, whereby predetermined tension by a spring force of the spring member 36 is applied to the cable 23.

In this way, in the opening and closing device 21, the ends of the cable 23 are fixed to the vehicle body 12 through the tensioners 32 and 33. Therefore, even after the opening and closing device 21 is mounted on the vehicle 11, the predetermined tension can be applied to the cable 23 and its tension can be adjusted.

To drive the drum 27 for rotation, an electric motor 37 as a driving source is fixed to the upper-side case 18*a*. In the case shown in Figure, a brush-equipped direct-current motor is used as the electric motor 37, and its output shaft 37*a* can be rotated in both forward and reverse directions. To control actuation of the electric motor 37, an unshown controller with a CPU, a memory, and the like is connected to the electric motor 37. Therefore, in response to an operation signal from an unshown opening and closing switch provided to a driver's seat, a portable terminal, or the like, the operation of the electric motor 37 is controlled by the controller.

As shown in FIG. 6, an output shaft 37*a* of the electric motor 37 protrudes inside the lower arm 18, and the driving pulley 41 is fixed to a tip portion of the output shaft 37*a*. On the other hand, a follower pulley 42 positioned below the drum 27 and having a diameter larger than that of the driving pulley 41 is fixed to the rotating shaft 28 to be fixed to the drum 27, and a belt 43 is bridged between these pulleys 41 and 42. For this reason, when the electric motor 37 is actuated, the rotation of the output shaft 37*a* is decelerated at a predetermined speed reduction ratio through the driving pulley 41, the belt 43, and the follower pulley 42, and is then conveyed to the rotating shaft 28, whereby the drum 27 is rotated. When the drum 27 is rotated, either one of the vehicle-front side and the vehicle-rear side of the cable 23 is wound up by the drum 27 and the other is wound back from the drum 27, whereby the cable 23 is pulled by the driving unit 22 and the sliding door 14 is opened and closed. For example, when the opening and closing switch is operated in a door-open direction, the controller makes the electric motor 37 rotate in a forward direction. This causes the vehicle-rear side of the cable 23 to be wound up by the drum 27 and the vehicle-front side thereof to be wound back from the drum 27, so that the sliding door 14 is pulled by the cable 23 and automatically opened. In contrast, when the opening and closing switch is operated in a door-close direction, the controller makes the electric motor 37 rotate in a reverse direction. This causes the vehicle-front side of the cable 23 to be wound up by the drum 27 and the vehicle-rear side thereof to be wound back from the drum 27, whereby the sliding door 14 is pulled by the cable 23 and automatically closed. That is, the sliding door 14 is driven by the driving unit 22 provided to the lower arm 18 and is automatically opened and closed.

In this way, in the opening and closing device 21, the lower arm 18 guided along the lower rail 19 is fixed to the sliding door 14, and the lower arm 18 is provided with the driving unit 22 for driving the sliding door 14 for opening and closing. Therefore, also as the self-propelled opening and closing device 21 in which the driving unit 22 is disposed on the side of the sliding door 14, the layout can be achieved without consideration of interference between the driving unit 22 and other devices disposed inside the sliding door 14. Accordingly, the layout flexibility of the driving unit 22 and the respective devices and the like disposed inside the sliding door 14 can be improved, so that the number of components and design costs of this opening and closing device 21 can be reduced. Also, since a configuration in which the driving unit 22 is provided to the lower arm 18 is adopted, the opening and closing device 21 can be mounted after the sliding door 14 is mounted on the vehicle body 12. In addition to this, an operation of assembling the opening and closing device 21 to the vehicle body 12 is facilitated, whereby mountability of the opening and closing device 21 on the vehicle 11 can be improved. In particular, if a configuration in which the driving unit 22 is incorporated inside the lower arm 18 is adopted, the mountability of the opening and closing device 21 on a vehicle-body assembling line can be further improved by incorporating in advance the driving unit 22 in the lower arm 18.

Also, in making a distinction in specifications between the vehicle 11 on which the opening and closing device 21 is mounted and vehicles without it, such specifications can be easily changed by replacing the lower arm 18 or by selecting, after mounting the sliding door 14 on the vehicle body 12, whether to mount the opening and closing device 21.

Furthermore, in the opening and closing device 21, the driving unit 22 is provided to the lower arm 18 guided along the lower rail 19. Therefore, when the sliding door 14 is closed to the full-close position, the cable 23 is covered with the sliding door 14 as well as the lower rail 19 and is not exposed outside. Therefore, the cable 23 can be protected from weather damages such as rain and wind, and also the appearance of the vehicle 11 can be improved by making the cable 23 invisible from the outside.

Still further, in the opening and closing device 21, since the driving unit 22 is incorporated inside the lower arm 18, the lower arm 18 on which the driving unit 22 is mounted is downsized and made thinner. Due to this, even if the driving unit 22 is provided to the lower arm 18, the height of a floor of the vehicle body 12 can be kept lower.

Figure 8:
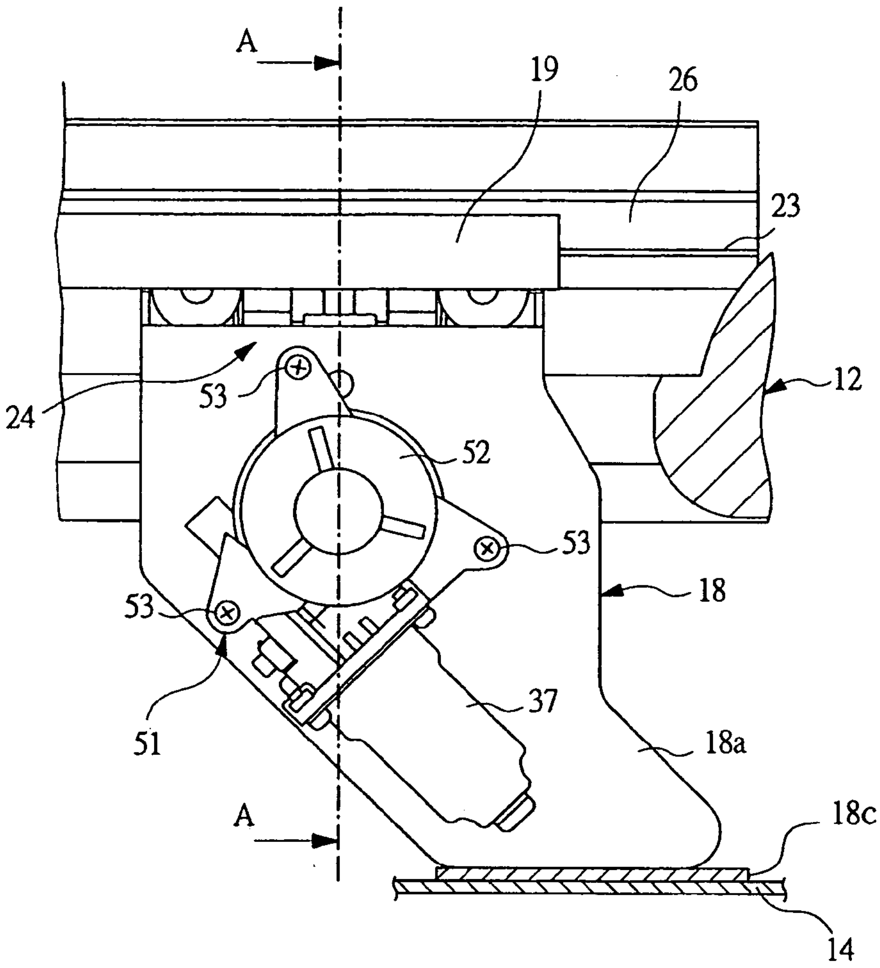
FIG. 8 is a front view showing a modification example of the driving unit shown in FIG. 4.
Figure 9:
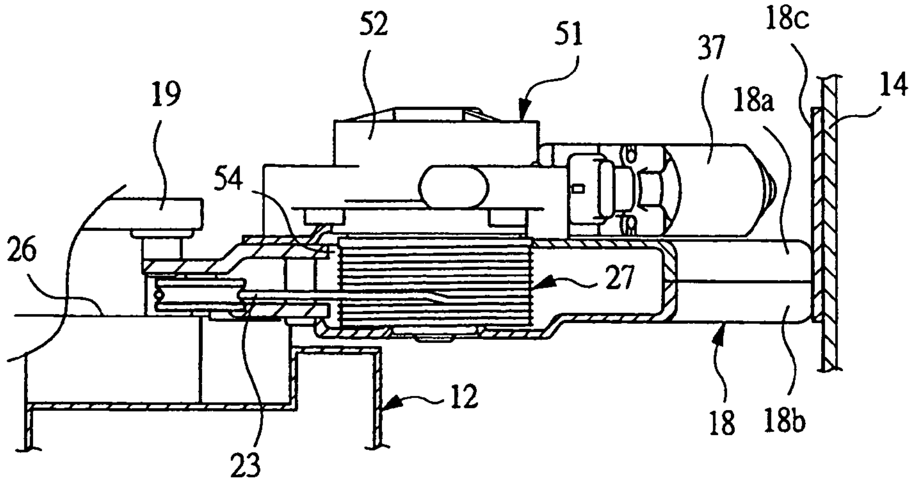
FIG. 9 is a section view taken along line A-A shown in FIG. 8.

FIG. 8 is a front view showing a modification example of the driving unit shown in FIG. 4. FIG. 9 is a section view taken along line A-A shown in FIG. 8. Note that, in FIGS. 8 and 9, members corresponding to the members already described above are denoted by the same reference numerals.

The driving unit 22 shown in FIG. 4 is configured to be incorporated inside the lower arm 18. However, it is not limited to such a configuration and, as shown in FIGS. 8 and 9, a driving unit 51 formed separately from the lower arm 18 may be fixed to the outside of the lower arm 18. In this case, the driving unit 51 has the electric motor 37 as a driving source and a decelerating mechanism 52 fixed to the electric motor 37 and, in the decelerating mechanism 52, is fixed to the upper-side case 18*a* of the lower arm 18 using fastening members 53. Also, the drum 27 is fixed to an unshown output shaft of the decelerating mechanism 52, and the drum 27 is inserted from an mounting hole 54 formed in the upper-side case 18*a* of the lower arm 18 so as to be disposed inside the lower arm 18. Further, the cable 23 is wound around the drum 27 a plurality of times. For this reason, when the electric motor 37 is actuated, its rotation is decelerated by the decelerating mechanism 52 to a predetermined revolution speed to drive the drum 27 for rotation. The sliding door 14 is then pulled by the cable 23 and is automatically opened and closed.

In this way, if a configuration in which the driving unit 51 formed separately from the lower arm 18 is fixed to the lower arm 18 is adopted, mountability of the driving unit 51 on the vehicle-body assembling line can be further improved. This can also facilitate a distinction in specifications between the vehicle 11 on which the opening and closing device 21 is mounted and the vehicles without it.

The present invention is not limited to the above embodiments and, needless to say, can be variously altered and modified within the scope of not departing from the gist thereof. For example, in the present embodiment, the driving units 22 and 51 are provided to the lower arm 18 so as to be guided along the lower rail 19. However, the present invention is not limited to such a configuration, and may be provided to the center arm 15 or the upper arm.

Also, in the present embodiment, both ends of one cable 23 are fixed to the vehicle body 12 and an intermediate portion thereof is bridged over the drum 27. However, the present invention is not limited to such a configuration. Alternatively, the present invention may adopt a configuration in which: respective bases of an open-side cable and a close-side cable are fixed to engagement grooves formed in both end surfaces of the drum; these cables are wound a plurality of times around a guide groove of the drum in reverse directions; a tip of the open-side cable is fixed to the vehicle body 12 on the vehicle-rear side of the lower rail 19; and a tip of the close-side cable is fixed to the vehicle body 12 on the vehicle-front side of the lower rail 19.

Furthermore, in the present embodiments, both ends of the cable 23 are directly fixed to the vehicle body 12. However, the present invention is not limited to such a configuration. Alternatively, both ends of the cable 23 may be fixed to the vehicle body 12 through, for example, both ends of the lower rail 19 or a bracket fixed to both ends of the lower rail 19.

Still further, in the present embodiment, the cable 23 is used as a cable member and the drum 27 with the guide groove 27*a* is used as a rotating member. However, the present invention is not limited to such a configuration. Alternatively, a belt, a chain, or the like may be used as a cable member, and a pulley or a sprocket may be used as a rotating member accordingly.

What is claimed is:

1. A sliding door opening and closing device for automatically opening and closing a platform provided in a side of a vehicle body by a sliding door, the device comprising:
- a guide rail fixed to the vehicle body;
- an arm member fixed to the sliding door and guided along the guide rail;
- a cable member, one end of the cable member being fixed to the vehicle body on one end side of the guide rail and the other end thereof being fixed to the vehicle body on the other end side of the guide rail; and
- a driving unit having a rotating member around which the cable member is winded and a driving source for driving the rotating member for rotation, the driving unit driving the sliding door for opening and closing,
- wherein the driving unit is provided to the arm member.

2. The sliding door opening and closing device according to claim 1, wherein both ends of the cable member are fixed to the vehicle body through tension generators.

3. The sliding door opening and closing device according to claim 1, wherein the guide rail is fixed to a lower edge of the platform, and the arm member is fixed to a lower end of the sliding door.

4. The sliding door opening and closing device according to claim 3, wherein the driving unit is incorporated inside the arm member.

* * * * *